United States Patent
Mühleisen et al.

(10) Patent No.: US 12,005,809 B2
(45) Date of Patent: Jun. 11, 2024

(54) METHOD FOR THE THERMAL CONDITIONING OF TRACTION BATTERIES

(71) Applicant: AUDI AG, Ingolstadt (DE)

(72) Inventors: Martin Mühleisen, Waldstetten (DE); Markus Ruf, Waldstetten (DE)

(73) Assignee: AUDI AG, Ingolstadt (DE)

( * ) Notice: Subject to any disclaimer, the term of this patent is extended or adjusted under 35 U.S.C. 154(b) by 131 days.

(21) Appl. No.: 17/510,097

(22) Filed: Oct. 25, 2021

(65) Prior Publication Data

US 2022/0126729 A1  Apr. 28, 2022

(30) Foreign Application Priority Data

Oct. 26, 2020 (DE) .......................... 102020128052.1

(51) Int. Cl.
*B60L 58/26* (2019.01)
*B60K 6/28* (2007.10)
(Continued)

(52) U.S. Cl.
CPC ............. *B60L 58/26* (2019.02); *B60L 58/27* (2019.02); *H01M 10/613* (2015.04); *H01M 10/615* (2015.04); *H01M 10/625* (2015.04); *H01M 10/633* (2015.04); *H01M 10/663* (2015.04); *B60K 6/28* (2013.01); *B60L 2240/545* (2013.01); *B60Y 2200/92* (2013.01); *B60Y 2306/05* (2013.01); *H01M 2220/20* (2013.01)

(58) Field of Classification Search
CPC .... B60L 58/26; B60L 58/27; B60L 2240/545; H01M 10/613; H01M 10/615; H01M 10/625; H01M 10/633; H01M 10/663; H01M 2220/20; B60Y 2306/05
See application file for complete search history.

(56) References Cited

U.S. PATENT DOCUMENTS

2011/0307131 A1\* 12/2011 Norden .............. B60H 1/00278
701/22
2013/0022888 A1\* 1/2013 Vollmer ............ H01M 8/04067
429/434

(Continued)

FOREIGN PATENT DOCUMENTS

CN  107487205 A  12/2017
CN  111251944 A  6/2020
(Continued)

*Primary Examiner* — Adam A Arciero
(74) *Attorney, Agent, or Firm* — Seed IP Law Group LLP

(57) ABSTRACT

A method is disclosed for the thermal conditioning of an electrochemical accumulator of a vehicle, wherein data are received and/or ascertained, and the data comprise a planned or expected parking duration, ambient data of the vehicle, thermal properties of the electrochemical accumulator, the received and/or ascertained data are evaluated, and based on the evaluated data steps are taken for the thermal conditioning of the electrochemical accumulator by the control unit prior to a parking of the vehicle, during a parking of the vehicle, or after a parking of the vehicle, wherein the steps for the thermal conditioning of the electrochemical accumulator remove or add thermal energy directly or indirectly to or from the electrochemical accumulator by a battery cooling circuit and/or a main cooling circuit of the vehicle.

8 Claims, 2 Drawing Sheets

(51) Int. Cl.
*B60L 58/27* (2019.01)
*H01M 10/613* (2014.01)
*H01M 10/615* (2014.01)
*H01M 10/625* (2014.01)
*H01M 10/633* (2014.01)
*H01M 10/663* (2014.01)

(56) References Cited

U.S. PATENT DOCUMENTS

2016/0362018 A1* 12/2016 Tanaka .............. H01M 10/6563
2019/0217721 A1* 7/2019 Marcicki .............. H01M 10/613
2019/0359083 A1 11/2019 Hettrich et al.

FOREIGN PATENT DOCUMENTS

DE 10 2012 222 587 A1 1/2014
WO WO-2013174275 A1 * 11/2013 ................ B60L 1/02

\* cited by examiner

METHOD FOR THE THERMAL CONDITIONING OF TRACTION BATTERIES

BACKGROUND

Technical Field

Embodiments of the invention relate to a method for the thermal conditioning of an electrochemical accumulator of a vehicle, as well as a vehicle layout for implementing such a method.

Description of the Related Art

At present, the electrochemical accumulators, especially the traction batteries, which are used in electric vehicles or hybrid vehicles have a relatively narrow temperature range within which the traction batteries can be charged or discharged with a high current. Low ambient temperatures and correspondingly cooled-down traction batteries result in lower performance of the traction battery.

Especially when parking the vehicle after its operation the traction battery may cool down to below its optimal operating temperature. The average standstill time of electric vehicles or hybrid vehicles before being started once again is less than 9 hours in more than 90% of the instances. If the temperature falls below the optimal operating temperature during this standstill, specific functions of hybrid vehicles such as pure electrical driving, braking recuperation, or even the power supply of electrical consumers will usually have only limited availability, so as not to impair the performance of the traction battery. In this way, hybrid vehicles have an increased $CO_2$ emission during low ambient temperatures.

Methods are known for warming up the traction battery during a charging process. However, it is first necessary to provide outside energy in order not to impair the capacity of the traction battery.

BRIEF SUMMARY

Embodiments described herein provide a method for conditioning the traction battery of a vehicle in an energy-efficient manner to an operation-optimized state before driving away.

In a method for the thermal conditioning of an electrochemical accumulator of a vehicle, data are received and/or ascertained in a first step.

For this, the vehicle may use a control unit internal or external to the vehicle in order to process data and save the data at least temporarily in a storage.

The data may involve a planned or anticipated parking duration, ambient data of the vehicle, thermal properties of the electrochemical accumulator and the like.

In a further step, the received and/or ascertained data are evaluated. Based on the evaluated data, steps are taken for the thermal conditioning of the electrochemical accumulator by the control unit prior to a parking of the vehicle, during a parking of the vehicle, or after a parking of the vehicle.

The steps taken for the thermal conditioning of the electrochemical accumulator prior to a parking of the vehicle, during a parking of the vehicle, or after a parking of the vehicle may consist in a direct or indirect removal of thermal energy from the electrochemical accumulator or furnishing of thermal energy to the electrochemical accumulator. A heat transfer may occur between the electrochemical accumulator and a battery cooling circuit and/or between the electrochemical accumulator and a main cooling circuit of the vehicle.

The particular steps and the time of initiating the steps may be dependent on a planned or anticipated parking duration of the vehicle, the ambient conditions, and the thermal properties of the electrochemical accumulator.

The electrochemical accumulator may be, for example, a traction battery or an auxiliary battery. In particular, the electrochemical accumulator may be based on lithium ion technology, lithium polymer technology, or the like.

In this way, an intelligent or self-adapting conditioning behavior can be provided for the electrochemical accumulators of vehicles, thereby boosting the efficiency and range of hybrid vehicles.

Since over 90% of all starting processes occur after a standstill or parking duration of less than 9 hours, the steps taken for the thermal conditioning of the electrochemical accumulator may be such that the optimal operating conditions, such as operating temperature, are maintained or restored after expiration of the parking duration.

In particular, with the method it is possible to bridge over the parking duration in terms of optimized operating conditions with the resources of the vehicle itself. Little or no electrical energy is removed from the electrochemical accumulator for this.

In this way, the pure electrical operating range of the hybrid vehicle and the customer acceptance of hybrid vehicles can be increased. Furthermore, the maintaining or restoring of optimized operating conditions for starting the vehicle once again results in less $CO_2$ emission of the vehicle, which also improves the test results of a so-called ATCT (Ambient Temperature Correction Test).

Thanks to the thermal conditioning steps taken in advance or lasting for the parking duration, there is little or no limiting of the electrical operating range of the hybrid vehicle.

Furthermore, the method increases the ride comfort thanks to no restrictions or compromises for the driving functions of the vehicle. The availability of the hybrid functionalities is reproducible, since the battery availability is also significantly increased.

The method makes possible a continuous use of the electrochemical accumulator within its optimal operating parameters, thus reducing the aging of the electrochemical accumulator.

In order to carry out the steps for the thermal conditioning of the electrochemical accumulator, thermal energy may be added to or removed from the electrochemical accumulator by a battery cooling circuit. Thanks to these steps, a normal operation of the vehicle can be realized during which the battery cooling circuit is used directly for providing and removing thermal energy.

In order to carry out the steps for the thermal conditioning of the electrochemical accumulator, thermal energy may be added to or removed from the electrochemical accumulator by a main cooling circuit of the vehicle. The main cooling circuit can be connected directly or indirectly to the electrochemical accumulator.

A main cooling circuit which can be coupled thermally and directly to the electrochemical accumulator allows the coolant of the main cooling circuit to be diverted through heat exchangers integrated in the electrochemical accumulator or arranged on the electrochemical accumulator. This may occur in parallel or in series with the battery cooling circuit.

In particular, the main cooling circuit of the vehicle or the hybrid vehicle may take on the function of the engine cooling of a combustion engine of the vehicle and thus function as a heat source or a heat sink.

The coolant in the main cooling circuit and/or in the battery cooling circuit may be used a heat source or a heat sink for the electrochemical accumulator.

Furthermore, additional components coupled thermally to the coolant of the main cooling circuit and/or the battery cooling circuit, such as radiators, evaporators, power electronics, combustion engine, intercooler, turbocharger, electrical consumers and the like, may be used as a heat source or a heat sink for the electrochemical accumulator.

According to another embodiment, for the transfer of thermal energy from the main cooling circuit to the electrochemical accumulator the thermal energy is transferred via a heat exchanger and/or via a heat accumulator between the main cooling circuit and the battery cooling circuit. The thermal energy transferred to the battery cooling circuit may be furnished to the electrochemical accumulator. Thanks to this step, an indirect thermal coupling can be realized between the electrochemical accumulator and the main cooling circuit.

The heat exchanger can thermally couple the coolant of the main cooling circuit to the coolant of the battery cooling circuit and thus make possible a temperature equalization. The heat exchanger can be turned on when needed by electromechanical valves.

The heat accumulator may have for example a solid or liquid material with a high specific heat capacity, in order to serve as a thermal buffer. Depending on the configuration, the heat accumulator may be designed as a latent heat accumulator.

Thanks to the described steps of the method, it is possible to realize in particular a utilization of the no-cost engine heat available by means of providing it directly to the electrochemical accumulator or by means of providing it to the heat accumulator and providing the thermal energy later on to the electrochemical accumulator.

According to another embodiment, the steps taken for the thermal conditioning of the electrochemical accumulator are initiated prior to a parking of the vehicle or during a parking of the vehicle in the form of providing thermal energy to the electrochemical accumulator while taking into account a thermal cooldown curve of the electrochemical accumulator and while taking into account the parking duration of the vehicle. The electrochemical accumulator is briefly warmed up in such a way that a predefined operating temperature of the electrochemical accumulator is maintained after the parking duration of the vehicle.

Thanks to these steps, the electrochemical accumulator can be preheated even before the start of the parking duration so that, after the elapsing of the parking duration, the temperature of the electrochemical accumulator continues to be within its optimal operating range. This corresponds to coming close to a minimum possible operating temperature from a higher temperature.

The preheating can be done once prior to or during the parking of the vehicle or many times in the course of the parking duration.

According to another embodiment, the steps taken for the thermal conditioning of the electrochemical accumulator are initiated after a parking of the vehicle in the form of providing thermal energy to the electrochemical accumulator while taking into account a thermal cooldown curve of the electrochemical accumulator and while taking into account the parking duration of the vehicle. A conditioning duration may be ascertained, ending before the expiration of the parking duration, and the steps taken for the thermal conditioning are carried out during the conditioning duration. In this way, thermal energy can be removed from the main cooling circuit or the heat accumulator during the parking duration in order to raise the temperature of the electrochemical accumulator to an optimal level in the course of the conditioning duration.

The method can be used in similar fashion for an overheated electrochemical accumulator. In particular, the temperature of the electrochemical accumulator can be lowered to an optimal operating level by giving up thermal energy.

The conditioning duration can be determined with the aid of Fourier's Law or the heat conduction equation. In this case, the conditioning duration corresponds to the time needed to heat the electrochemical accumulator from a presumable or measured actual temperature to a target temperature or an optimal operating temperature. The thermal energy in the main cooling circuit and/or the battery cooling circuit of the vehicle can be ascertained or estimated at the start of the conditioning duration, in order to make possible an especially precise determination of the conditioning duration. The conditioning duration can be determined by an algorithm or by a simulation.

According to another embodiment, a coolant of the battery cooling circuit and/or the main cooling circuit of the vehicle is heated for providing thermal energy by taking up braking recuperation energy in the form of thermal energy and/or by taking up heat from at least one consumer of the vehicle. Thanks to this step, electrical energy and/or thermal energy generated during the braking can be used for the conditioning of the electrochemical accumulator. For example, the electrical braking recuperation energy can be transformed into thermal energy in an electrical brake resistor and given off to the battery cooling circuit.

According to another embodiment, the data on a planned or anticipated parking duration are received from a manual entry or ascertained by a self-learning system, such as a neural net which has been trained in advance. The typical parking durations of a driver of the hybrid vehicle can be analyzed with the aid of a history, in order to estimate an anticipated parking duration. Furthermore, various parameters or data of the electrochemical accumulator, the main cooling circuit and the battery cooling circuit can be gathered and evaluated in order to determine a conditioning duration.

The data may be received, ascertained and evaluated by a control unit internal or external to the vehicle.

Based on the received data, a decision can be made as to when to initiate the steps for the thermal conditioning of the electrical accumulator. Furthermore, the duration of the steps or the conditioning duration can be determined.

In some embodiments, a vehicle layout is provided. The vehicle layout may be intended for a vehicle or be integrated in the vehicle, which is designed as a hybrid vehicle and which comprises a main cooling circuit and a battery cooling circuit. Furthermore, the vehicle comprises at least one electrochemical accumulator, which is coupled thermally to the battery cooling circuit and directly or indirectly to the main cooling circuit. The main cooling circuit may be coupled thermally to a combustion engine of the vehicle. The combustion engine may be designed as a drive motor or as a generator for the power supply. The vehicle is adapted to carry out the method described herein.

Thanks to the method, the at least one electrochemical accumulator of the vehicle can be raised to an optimal operating level even after a parking and at low ambient temperatures. In particular, the waste heat of the combustion engines from the main cooling circuit of the vehicle can be used for the thermal conditioning of the electrochemical accumulator. The electrochemical accumulator can then be heated at least briefly to a maximum or higher operating temperature, in order to have a sufficiently warm electrochemical accumulator for immediate operation of hybrid functions of the vehicle even after the parking duration.

BRIEF DESCRIPTION OF THE SEVERAL VIEWS OF THE DRAWINGS

Embodiments of the invention are represented schematically in the drawings and shall be described further with reference to the drawings.

DETAILED DESCRIPTION

Embodiments of the invention shall now be explained, making reference to the drawings. The same components are given the same reference symbols.

Figure 1:
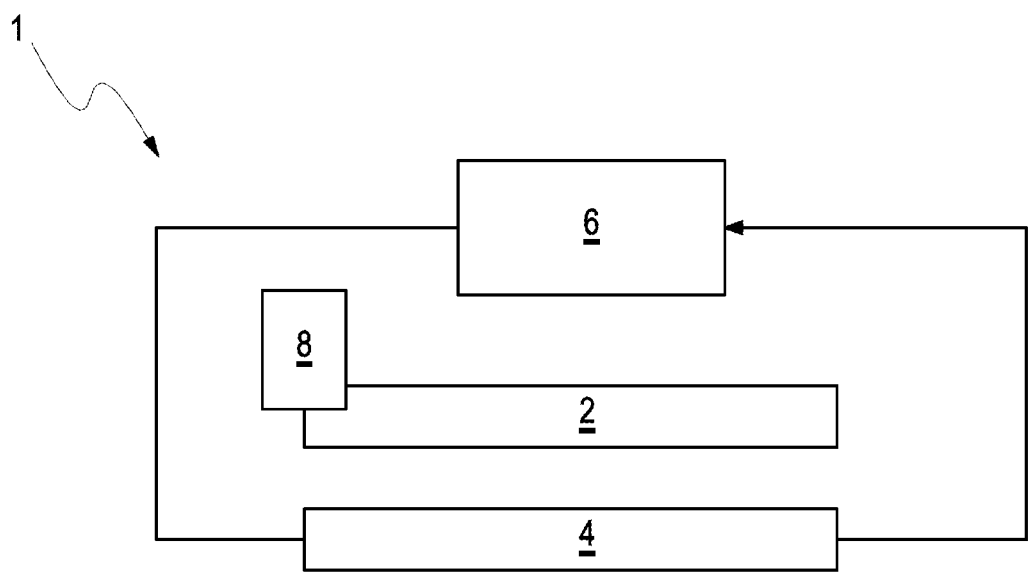
FIG. 1 shows a vehicle layout according to a first embodiment of the invention.

FIG. 1 shows a vehicle layout 1 according to a first embodiment of the invention. The vehicle layout 1 comprises a main cooling circuit 2 and a battery cooling circuit 4.

Furthermore, the vehicle layout 1 comprises at least one electrochemical accumulator 6. The electrochemical accumulator 6 is coupled thermally to the battery cooling circuit 4 and directly or indirectly to the main cooling circuit 2.

The main cooling circuit 2 may be coupled thermally to a combustion engine 8 of the vehicle. The combustion engine 8 is designed as a drive motor, for example.

The electrochemical accumulator 6 is designed as a traction battery and is based on a lithium ion technology in the embodiment shown. The electrochemical accumulator 6 may be designed as a battery system or as a battery module with multiple battery cells.

In place of the combustion engine 8, any given consumer which generates heat also can be connected thermally to the main cooling circuit 2 or the battery cooling circuit 4 in order to provide thermal energy for the electrochemical accumulator 6.

FIG. 1 illustrates a regular operation of the vehicle, during which the temperature of the electrochemical accumulator 6 lies in an optimal temperature range, for example 30° C. to 50° C. The thermal regulation of the electrochemical accumulator 6 is taken on entirely by the battery cooling circuit 4.

Upon parking the vehicle, steps are taken so that optimal operating conditions will prevail for the electrochemical accumulator 6 in the form of a so-called "comfort temperature" the next time it is started. For this, a lot of information and data are registered and evaluated by a control unit 10 (FIG. 2).

Figure 2:
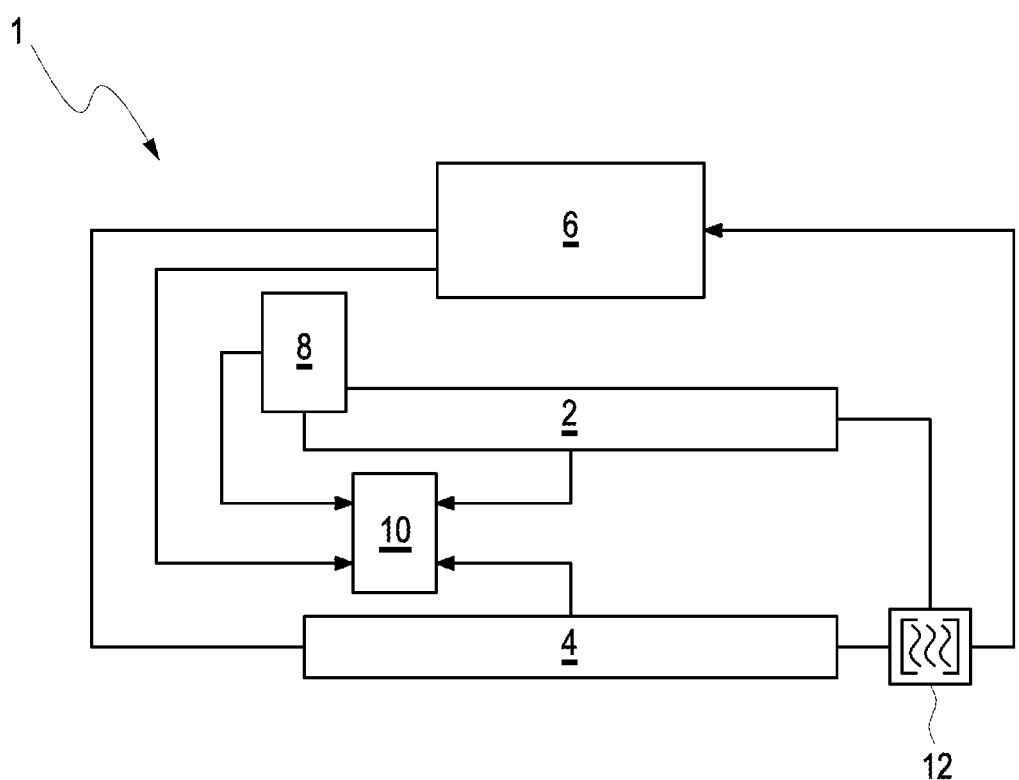
FIG. 2 shows a vehicle layout according to a second embodiment of the invention.

A predicted or anticipated parking duration of the vehicle, a manual entry of the parking duration by a driver, ambient data such as an expected ambient temperature from weather forecast information and the thermal properties of the electrochemical accumulator 6 can be received and evaluated by the control unit 10 (FIG. 2).

The anticipated parking duration of the vehicle can be determined by a self-learning system, such as a neural net. The thermal properties of the electrochemical accumulator 6 may take account of an entire battery system with the respective battery cells in a package and in a housing. In this way, a cooldown curve dependent on the ambient temperature and the temperature of the electrochemical accumulator 6 can be created or used.

If the vehicle has been parked, it is possible to determine in the context of the method described herein whether steps should be taken for the thermal conditioning of the electrochemical accumulator 6 already during the parking of the vehicle or after a parking of the vehicle. This function can be implemented by the control unit 10 (FIG. 2) of the vehicle layout 1.

In particular, the steps may be initiated a sufficient time before the anticipated or planned vehicle start, in order to condition the electrochemical accumulator 6 with thermal energy so that it can find itself in an optimal temperature range regardless of the parking duration and independently of the ambient conditions during the vehicle start.

The heat is furnished through the low-temperature battery cooling circulation 4. The steps are initiated directly upon parking the vehicle, for example if the parking duration falls below a predefined threshold value.

If the parking duration is greater than the predefined threshold value, a conditioning duration can be determined, serving as the basis for a starting of the steps for the thermal conditioning after the parking of the vehicle.

A starting time for initiating the steps can be determined by the ascertained parking duration, minus the conditioning duration.

For example, the heat capacity of the electrochemical accumulator 6 together with an introduced coolant (each having different temperatures) is used for initiating the steps upon parking or during the parking of the vehicle and a hybrid temperature is calculated. This will be adjusted such that the maximum temperature is never exceeded.

Alternatively, the thermal energy is only supplied to the electrochemical accumulator 6 from a heat accumulator 12 after the parking of the vehicle and shortly before starting the vehicle or after expiration of the parking duration. This is represented in FIG. 2 in the form of a vehicle layout 1 according to a second embodiment of the invention.

The heat accumulator 12 may form an indirect thermal coupling between the main cooling circuit 2 and the battery cooling circuit 4.

Optionally, a portion of the coolant of the battery cooling circuit 4 may also be heated further during vehicle operation by excess braking recuperation and a heating element. Shortly after parking the vehicle, this coolant is then provided to the battery system or used to heat the electrochemical accumulator 6.

In order to carry out the thermal conditioning afterwards upon parking or during a parking or after a parking of the vehicle and before a starting of the vehicle, thermal energy can be removed from the heat accumulator 12 and supplied to the electrochemical accumulator 6.

The heat accumulator 12 is fed by the main cooling circuit 2 and/or by the battery cooling circuit 4 during operation of the vehicle. If need be, for example if the temperature falls below 30° C. in the electrochemical accumulator 6, the thermal energy can be removed from the heat accumulator 12 in the form of a step taken for the thermal conditioning.

Enough thermal energy may be stored in the heat accumulator 12 so that the electrochemical accumulator 6 can be warmed up to at least 30° C. for the starting of the vehicle.

The heat accumulator 12 may contain, for example, a solid or liquid material with a high specific heat capacity, in order to serve as a thermal buffer. Depending on the design, the heat accumulator may be configured as a latent heat accumulator.

Figure 3:
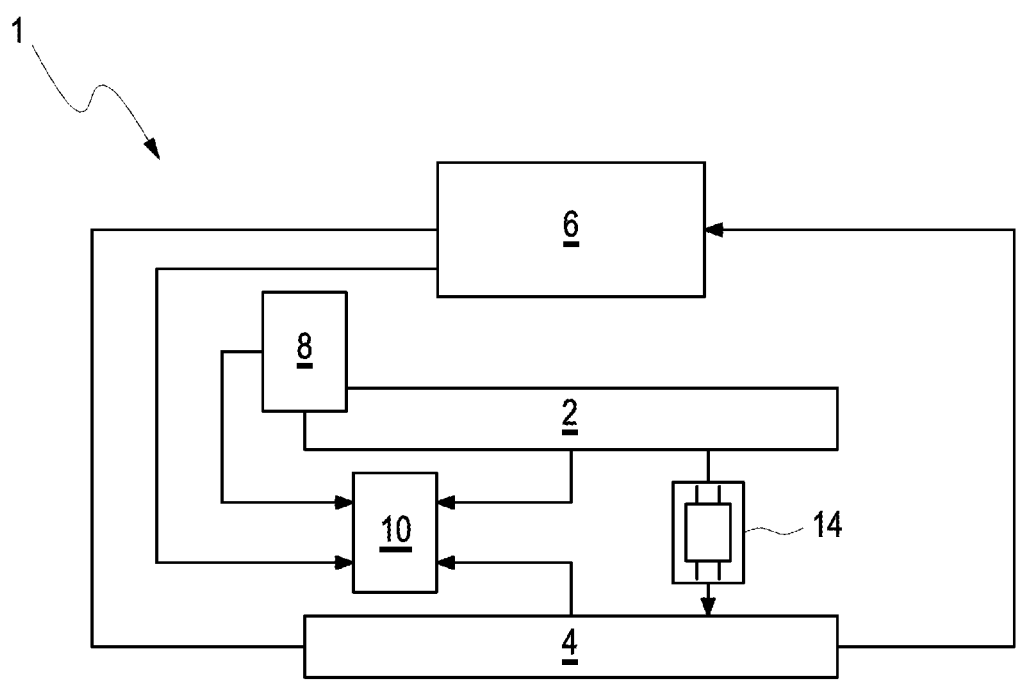
FIG. 3 shows a vehicle layout according to a third embodiment of the invention.

FIG. 3 shows a vehicle layout 1 according to a third embodiment of the invention. A further step taken for the thermal conditioning of the electrochemical accumulator 6 is illustrated. After parking the vehicle, thermal energy is transferred from the main cooling circuit 2 to the battery cooling circuit 4 and thus to the electrochemical accumulator 6 during the conditioning operation. For this indirect heat transfer, a heat exchanger 14 is provided, which thermally couples the main cooling circuit 2 to the battery cooling circuit 4.

Enough heat is provided to the electrochemical accumulator 6 so that during the next starting of the vehicle there will still prevail approximately 30° C. in the electrochemical accumulator 6.

The initiating of the steps taken for the thermal conditioning of the electrochemical accumulator 6 may be done by the control unit 10. The starting time of the steps, the conditioning duration due to the steps, and the kind of steps taken can be determined by the control unit 10 based on the data received. The control unit 10 may be configured as a neural net, which has been trained in advance. The control unit 10 may work as a self-learning unit and in particular it may estimate the parking duration of the vehicle automatically, in order to make possible a timely initiating of the thermal conditioning.

German patent application no. 10 2020 128052.1, filed Oct. 26, 2020, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for thermal conditioning of an electrochemical accumulator of a vehicle, comprising:
receiving and/or ascertaining data including a planned or expected parking duration, ambient data of the vehicle, and thermal properties of the electrochemical accumulator;
evaluating the received and/or ascertained data; and
based on the evaluated data, taking action to thermally condition the electrochemical accumulator after parking of the vehicle in the form of providing thermal energy to the electrochemical accumulator while taking into account a thermal cooldown curve of the electrochemical accumulator and while taking into account the parking duration of the vehicle, and a conditioning duration is ascertained, ending before the expiration of the parking duration, and the steps taken for the thermal conditioning are carried out during the conditioning duration, and wherein the action provides thermal energy to the electrochemical accumulator by a battery cooling circuit and/or a main cooling circuit of the vehicle.

2. The method according to claim 1, wherein, for the purpose of transferring thermal energy from the main cooling circuit to the electrochemical accumulator, the thermal energy is transferred via a heat exchanger and/or via a heat accumulator between the main cooling circuit and the battery cooling circuit and the thermal energy transferred to the battery cooling circuit is furnished to the electrochemical accumulator.

3. The method according to claim 1, wherein another action is initiated prior to a parking of the vehicle or during a parking of the vehicle in the form of providing thermal energy to the electrochemical accumulator while taking into account a thermal cooldown curve of the electrochemical accumulator and while taking into account the parking duration of the vehicle, and the electrochemical accumulator is warmed up in such a way that a predefined operating temperature of the electrochemical accumulator is maintained after the parking duration of the vehicle.

4. The method according to claim 1, wherein a coolant of the battery cooling circuit and/or the main cooling circuit of the vehicle is heated for providing thermal energy by taking up braking recuperation energy in the form of thermal energy and/or by taking up heat from at least one consumer of the vehicle.

5. The method according to claim 1, wherein the data on a planned or anticipated parking duration are received from a manual entry or ascertained by a self-learning system.

6. The method according to claim 5, wherein the self-learning system includes a neural net which has been trained in advance.

7. The method according to claim 1, wherein the method is performed by a control unit of the vehicle.

8. A vehicle, comprising:
a main cooling circuit;
a battery cooling circuit; and
at least one electrochemical accumulator, which is coupled thermally to the battery cooling circuit and directly or indirectly to the main cooling circuit, and
wherein the vehicle is adapted to implement a method for thermal conditioning the electrochemical accumulator comprising:
receiving and/or ascertaining data including a planned or expected parking duration, ambient data of the vehicle, and thermal properties of the electrochemical accumulator;
evaluating the received and/or ascertained data; and
based on the evaluated data, taking action to thermally condition the electrochemical accumulator after parking of the vehicle in the form of providing thermal energy to the electrochemical accumulator while taking into account a thermal cooldown curve of the electrochemical accumulator and while taking into account the parking duration of the vehicle, and a conditioning duration is ascertained, ending before the expiration of the parking duration, and the steps taken for the thermal conditioning are carried out during the conditioning duration, and
wherein the action provides thermal energy to the electrochemical accumulator by the battery cooling circuit and/or the main cooling circuit of the vehicle.

* * * * *